United States Patent
Kimura

(10) Patent No.: US 6,927,917 B2
(45) Date of Patent: Aug. 9, 2005

(54) OPTICAL ELEMENT, SCANNING OPTICAL SYSTEM HAVING THE SAME, AND IMAGE FORMING APPARATUS

(75) Inventor: Kazumi Kimura, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 10/147,896

(22) Filed: May 20, 2002

(65) Prior Publication Data

US 2002/0179827 A1 Dec. 5, 2002

(30) Foreign Application Priority Data

May 25, 2001 (JP) .................................. 2001-157368

(51) Int. Cl.[7] .......................... G02B 27/10; G02B 26/08
(52) U.S. Cl. ...................................... 359/619; 359/206
(58) Field of Search ................................. 359/619–620, 359/613, 565, 569, 575, 206–207

(56) References Cited

U.S. PATENT DOCUMENTS

| | | | |
|---|---|---|---|
| 5,459,601 A | 10/1995 | Suzuki et al. ............... | 359/205 |
| 5,694,247 A | 12/1997 | Ophey et al. ............... | 359/566 |
| 5,838,480 A | * 11/1998 | McIntyre et al. ........... | 359/206 |
| 6,222,661 B1 | 4/2001 | Takeuchi et al. ............ | 359/205 |
| 6,424,446 B2 | * 7/2002 | Toyoda et al. .............. | 359/206 |

FOREIGN PATENT DOCUMENTS

| | | |
|---|---|---|
| EP | 1 215 513 | 6/2002 |
| JP | 58-174906 | 10/1983 |
| JP | 10-160906 | 6/1998 |
| JP | 2000-137109 | 5/2000 |
| JP | 2000-206445 | 7/2000 |
| JP | 2001-305455 | 10/2001 |
| WO | 95/30163 | 11/1995 |

OTHER PUBLICATIONS

Thomas K. Gaylord, W. E. Baird, and M. G. Moharam, "Zero–reflectivity high spatial–frequency rectangular–groove dielectric surface–relief gratings," Applied Optics, vol. 25, No. 24, 4562–4567 (Dec. 15, 1986).

Eric B. Grann, et al., "Artificial Uniaxial Dielectrics With Use of Two–dimensional Subwavelength Binary Gratings," J. Opt. Soc. Am. A, vol. 11, No. 10, 2695 (Oct. 1994).

Max Born and Emil Wolf, "Principles of Optics," 1026–1033 (Tokai University Press, 1979).

* cited by examiner

Primary Examiner—Georgia Epps
Assistant Examiner—Alicia M. Harrington
(74) Attorney, Agent, or Firm—Fitzpatrick, Cella, Harper & Scinto

(57) ABSTRACT

The optical element has a microstructure lattice formed on at least one optical surface. In the optical element, the microstructure lattice is formed from an arrangement for adjusting a change in an amount of light transmitted which is caused as an incidence angle of a light beam changes from a central portion to a peripheral portion.

27 Claims, 10 Drawing Sheets

PITCH OF ZERO-ORDER LATTICE ($\lambda = 0.78$, $N = 1.524$)

OPTICAL ELEMENT, SCANNING OPTICAL SYSTEM HAVING THE SAME, AND IMAGE FORMING APPARATUS

BACKGROUND OF THE INVENTION

1. Field of the Invention

The present invention relates to an optical element which exhibits a change in incidence angle and a scanning optical system having the optical element. The present invention is suitable for an image forming apparatus such as a laser beam printer or digital copying apparatus which has, for example, an electrophotographic process of deflecting a light beam emitted from a light source means by using a light deflector (deflecting means), and recording image information by optically scanning a scanning target surface through a scanning optical means including an optical element having f-θ characteristics and a microstructure lattice formed thereon.

2. Related Art

In a conventional scanning optical system such as a laser beam printer (LBP), a light beam which is optically modulated in accordance with an image signal and emitted from a light source means is cyclically deflected by a light deflector formed from, e.g., a polygon mirror, and the light beam is focused into a spot on the surface of a photosensitive recording medium and optically scanned by an imaging optical system having f-θ characteristics.

FIG. 13 is a sectional view (main scanning cross-section) of a conventional scanning optical system in the main scanning direction.

Referring to FIG. 13, a light source means 91 is formed from, for example, a semiconductor laser or the like. A collimator lens 92 converts a divergent light beam emitted from the light source means 91 into an almost parallel light beam. An aperture stop 93 shapes a beam shape by limiting a light beam that passes through. A cylindrical lens 94 has a predetermined power in only the sub-scanning direction and forms a light beam which passes through the aperture stop 93 into an almost line image on a deflecting surface (reflecting surface) 95a of a light deflector 95 (to be described later) within a sub-scanning cross-section.

The light deflector 95 serving as a deflecting means is formed from, for example, a polygon mirror (rotating polyhedral mirror) having a tetrahedral arrangement. The light deflector 95 is rotated by a driving means (not shown) such as a motor at constant speed in the direction indicated by an arrow A in FIG. 13.

A scanning lens system 96 serves as a scanning optical means having a focusing function and f-θ characteristics and is formed from first and second scanning lenses 96a and 96b. The scanning lens system 96 forms the light beam based on image information, which is reflected/deflected by the light deflector 95, into an image on a photosensitive drum surface 97 serving as a scanning target surface, and has an optical face tangle error correction function of making the deflecting surface 95a of the light deflector 95 and the photosensitive drum surface 97 have a conjugate relationship within a sub-scanning cross-section.

Referring to FIG. 13, the divergent light beam emitted from the semiconductor laser 91 is converted into an almost parallel light beam by the collimator lens 92, and the light beam (light amount) is limited by the aperture stop 93. The resultant light beam is incident on the cylindrical lens 94. Of the substantially parallel light beam incident on the cylindrical lens 94, the light in a main scanning cross-section emerges without any change. The light in a sub-scanning cross-section is focused and substantially formed into a line image (elongated in the main scanning direction) on the deflecting surface 95a of the light deflector 95. The light beam reflected/deflected by the deflecting surface 95a of the light deflector 95 is formed into a spot on the photosensitive drum surface 97 via the first and second scanning lenses 96a and 96b. This light beam is then scanned on the photosensitive drum surface 97 at constant speed in the direction indicated by an arrow B (main scanning direction) by rotating the light deflector 95 in the direction indicated by the arrow A. With this operation, an image is recorded on the photosensitive drum surface 97 as a recording medium.

The above conventional scanning optical system, however, has the following problems.

Recently, the scanning optical means (scanning lens system) of a scanning optical system is generally made of a plastic material that allows easy formation of an aspherical shape and is easy to manufacture. It is, however, difficult in terms of technique and cost to form an antireflection coat on the lens surface of a plastic lens. As a consequence, Fresnel reflection occurs on each optical surface.

FIG. 14 is a graph for explaining the angle dependency of reflectance and transmission when a P-polarized light beam is incident on, for example, a resin optical member having refractive index n=1.524. As shown in FIG. 14, the surface reflection on each optical surface increases with an increase in incidence angle.

The first problem is therefore that surface reflected light on a lens surface without an antireflection coat is reflected by other optical surfaces and finally reaches a scanning target surface to produce ghosts. If one of the two scanning lenses which is closer to the light deflector has a concave lens surface and a light beam incident thereon is nearly vertical, Fresnel reflected light on this lens surface returns to the light deflector and reflected by the deflecting surface (reflecting surface) of the light deflector. This reflected light passes through the scanning optical means and reaches the scanning target surface to become a ghost.

The second problem is that since the incidence angle of a light beam incident on the scanning optical means generally changes as it travels from an on-axis position (scanning center) to an off-axis position (scanning periphery), Fresnel reflection on each optical surface greatly changes to produce a difference between the light amount at an on-axis position and that at an off-axis position.

FIG. 15 is a graph showing a transmission on each surface when P-polarized light beam is incident on the scanning optical means in FIG. 13. As shown in FIG. 14, since the reflectance decreases (transmission increases) with an increase in incidence angle, the transmission of the overall system increases from an on-axis position to an off-axis position. That is, the illuminance distribution on the scanning target surface also increases from an on-axis position to an off-axis position.

According to the graph of FIG. 15, the light amount at the outermost off-axis position is larger than that at an on-axis position by 5%. As a result, the image output from the image forming apparatus has a density difference between a central portion and a peripheral portion.

An attempt has been made to solve this problem by adjusting the diffraction efficiency of a diffraction grating placed in a scanning optical means as in Japanese Patent Application Laid-Open No. 2000-206445. More specifically, a lattice is formed at a desired pitch with a desired power distribution to realize magnification chromatic aberration correction or focus correction, and the lattice height (depth) of the diffraction grating surface is properly set to change the diffraction efficiency of diffracted light (1st-order diffracted light) to be used at an on-axis position and an off-axis position, thereby canceling out a change in transmission on other refracting surfaces.

In this method, however, as the diffraction efficiency of diffracted light to be used is reduced, diffracted light of another order (to be also referred to as unnecessary diffracted light) increases. The increased diffracted light of another order reaches the scanning target surface to become flare light to cause image deterioration unless the light is shielded by using a light-shielding wall or the like.

SUMMARY OF THE INVENTION

It is an object of the present invention to provide an optical element which can easily adjust the amount of light transmitted as the incidence angle of a light beam changes and is suitably applied to an image forming apparatus such as a laser beam printer or digital copying machine having an electrophotographic process, and a scanning optical system having the optical element.

It is another object of the present invention to provide an optical element which reduces Fresnel reflection on a lens surface which causes Flare or ghosts without increasing any step such as a coating step, and can make the light amount distribution on a scanning surface uniform, and a scanning optical system having the optical element.

It is still another object of the present invention to provide an optical element which can make the illuminance distribution almost uniform in a wide area on an image surface, and an optical system using the optical element.

Further object of the present invention is to provide an optical element having a microstructure lattice formed on at least one optical surface, wherein the microstructure lattice is formed from an arrangement for collecting a change in an amount of light transmitted which is caused as an incidence angle of a light beam changes from a central portion to a peripheral portion.

In the present invention, it is preferable that the microstructure lattice is a zero-order lattice.

In the present invention, it is preferable that the optical surface is a lens surface, diffracting surface, or mirror surface, and comprises a flat or curved surface.

In the present invention, it is preferable that the microstructure lattice is integrally formed with a substrate on which the optical surface is formed.

In the present invention, it is preferable that the arrangement for collecting the change in the amount of light transmitted is based on at least one of a lattice pitch, lattice depth, and lattice constant of the microstructure lattice.

In the present invention, it is preferable that a material for the microstructure lattice is a transparent resin or glass material.

Further object of the present invention is to provide an optical system comprising any one of above mentioned optical elements.

Further object of the present invention is to provide a scanning optical system for deflecting a light beam emitted from light source means by using deflecting means, guiding the light beam deflected by the deflecting means onto a scanning surface by using scanning optical means, and scanning the scanning surface, wherein the scanning optical means includes an optical element having a microstructure lattice formed on at least one optical surface, and the microstructure lattice is formed from an arrangement for collecting a change in an amount of light transmitted which is caused as an incidence angle of a light beam incident on the optical element from an on-axis position to an off-axis position.

In the present invention, it is preferable that the optical surface on which the microstructure lattice is formed is a surface, of optical surfaces of the scanning optical means, which exhibits a largest change in incidence angle due to a field angle.

In the present invention, it is preferable that the microstructure lattice is configured such that a direction of change in the total amount of light transmitted changing from a scanning center of an optical surface on which the microstructure lattice is provided to a scanning periphery is opposite to a direction of change in the total amount of light transmitted changing from a scanning center of an optical surface on which the microstructure lattice is not provided to a scanning periphery.

In the present invention, it is preferable that the microstructure lattice is formed on all optical surfaces of the scanning optical means.

In the present invention, it is preferable that the microstructure lattice is a zero-order lattice.

In the present invention, it is preferable that each optical surface other than the surface on which the microstructure lattice is formed is formed from a refracting surface or/and a reflecting surface, and the change in the total amount of light beam transmitted the scanning optical means is based on a transmission produced when an incidence angle of a light beam changes from a scanning center to a scanning periphery on the refracting surface or/and a reflectance produced when an incidence angle of a light beam changes from a scanning center to a scanning periphery on the reflecting surface.

In the present invention, it is preferable that letting $\theta$ be a scanning angle, $Id(\theta)$ be the total amount of light transmitted through the microstructure lattice at the scanning angle $\theta$, and $It(\theta)$ be the total amount of light transmitted, at the scanning angle $\theta$, through an optical surface other than the optical surface on which the microstructure lattice is formed, $0.8 < (Id(\theta) \times It(\theta))/(Id(0) \times It(0)) < 1.2$ is satisfied within all of the scanning angle.

Further object of the present invention is to provide a scanning optical system for deflecting a light beam emitted from light source means by using deflecting means, guiding the light beam deflected by the deflecting means onto a scanning surface by using scanning optical means, and scanning the scanning surface, wherein the scanning optical means includes an optical element having a microstructure lattice formed on at least one optical surface, and $Py < \lambda/(Ns + Ni \cdot \sin \theta i)$ is satisfied, where $Py$ is a lattice pitch at a position y from a center at which a light beam reaching a predetermined image height on the scanning surface passes through the microstructure lattice, $\lambda$ is a wavelength of a light beam from the light source means, $\theta i$ is an incidence angle of a light beam at the position y, $Ni$ is a refractive index of a medium on an incident side of the microstructure lattice, and $Ns$ is a refractive index of a medium on an exit side of the microstructure lattice.

In the present invention, it is preferable that in order to reduce a light amount difference between a scanning center and a scanning periphery on a scanning surface, at least one of a lattice pitch, lattice depth, and lattice constant is determined for the microstructure lattice in accordance with an incidence angle at a position where a light beam reaching a predetermined image height passes through the microstructure lattice.

In the present invention, it is preferable that letting Pymax be a lattice pitch determined when a maximum incidence angle of a light beam incident on the microstructure lattice is set to θymax, the microstructure lattice is formed at a pitch P given by P<Pymax.

In the present invention, it is preferable that at least one of a lattice pitch, lattice depth, and lattice constant is changed at a scanning center and a scanning periphery on the microstructure lattice in accordance with an incidence angle at a position where a light beam reaching a predetermined image height passes through the microstructure lattice.

In the present invention, it is preferable that the optical surface on which the microstructure lattice is formed is a surface, of optical surfaces of the scanning optical means, which exhibits a largest change in incidence angle due to a field angle.

In the present invention, it is preferable that the microstructure lattice is configured such that a direction of change in the total amount of light transmitted changing from a scanning center of an optical surface on which the microstructure lattice is provided to a scanning periphery is opposite to a direction of change in the total amount of light transmitted changing from a scanning center of an optical surface on which the microstructure lattice is not provided to a scanning periphery.

In the present invention, it is preferable that the microstructure lattice is formed on all optical surfaces of the scanning optical means.

In the present invention, it is preferable that the microstructure lattice is formed on an optical surface which is a spherical surface, aspherical surface, rotational asymmetrical curved surface, or diffracting surface.

In the present invention, it is preferable that the microstructure lattice is formed on a flat optical surface.

In the present invention, it is preferable that a material for the microstructure lattice is a transparent resin or glass material.

Further object of the present invention is to provide an image forming apparatus comprising any one of above mentioned the scanning optical system, a photosensitive member placed on the scanning surface, a developing device which develops an electrostatic latent image, formed on the photosensitive member by a light beam scanned by the scanning optical system, as a toner image, a transferring device which transfers the developed toner image onto a transfer material, and a fixing deice which fixes the transferred toner image onto the transfer material.

Further object of the present invention is to provide an image forming apparatus comprising any one of above mentioned scanning optical system, and a printer controller which converts code data input from an external device into an image signal, and inputs the image signal to the scanning optical system.

In the present invention, it is preferable that, when the incidence angle of the light beam to be incident to the microstructure lattice is set θ and an amount of light transmitted on the microstructure lattice surface is set Is(θ), $0.9 < Is(\theta)/Is(0) < 1.1$ is satisfied.

DETAILED DESCRIPTION OF THE PREFERRED EMBODIMENTS (First Embodiment)

An optical element according to the present invention is an optical element having a microstructure lattice formed on at least one optical surface. The microstructure lattice is designed to adjust a change in the amount of light transmitted which is caused as the incidence angle of a light beam changes from the central portion to the peripheral portion.

The optical element of the present invention can be applied to various optical systems, e.g., a photographing system, projection system, and image forming system, in which the incidence angle changes from the central portion to the peripheral portion of the element.

Figure 1:
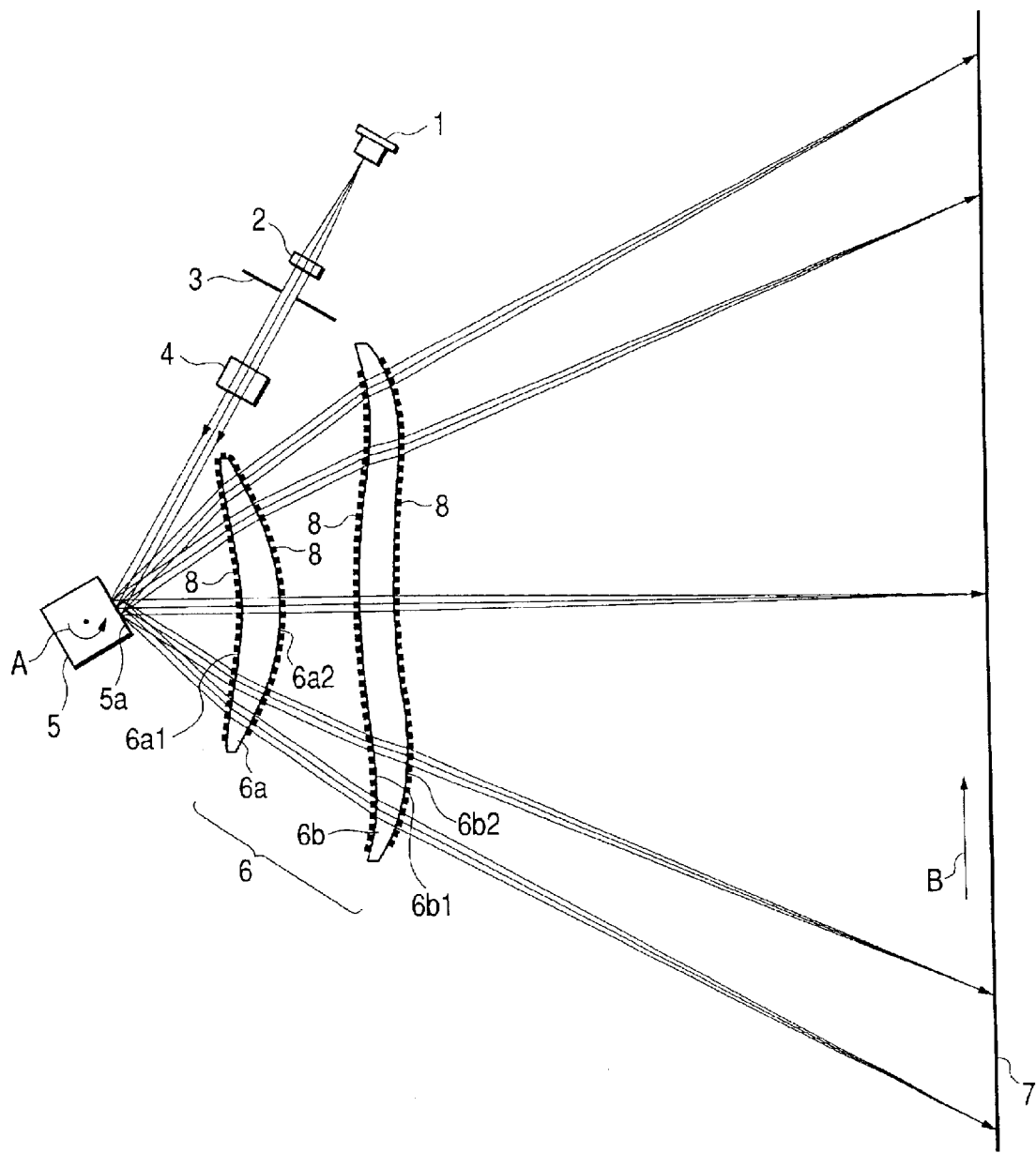
FIG. 1 is a sectional view of the first embodiment of the present invention in the main scanning direction.

The first embodiment in which the optical element of the present invention is applied to a scanning optical system will be described next with reference to FIGS. 1 to 5. FIG. 1 is a sectional view (main scanning sectional view) of the main part of the scanning optical system in the main scanning direction according to the first embodiment of the present invention.

In this specification, the direction in which a light beam is reflected/deflected (deflected/scanned) by a deflecting means is defined as a main scanning direction, and a direction perpendicular to the optical axis of the scanning optical means and the main scanning direction is defined as a sub-scanning direction.

Referring to FIG. 1, a light source means 1 is formed from, for example, a semiconductor laser. A collimator lens 2 converts the divergent light beam emitted from the light source means 1 into a substantially parallel light beam. An aperture stop 3 limits a light beam that passes therethrough and shapes it into a beam shape. A cylindrical lens 4 has a predetermined power only in the sub-scanning direction and forms the light beam having passed through the aperture stop 3 into an almost line image on a deflecting surface (reflecting surface) 5a of a light deflector 5 (to be described later) within a sub-scanning cross-section.

The light deflector 5 serves as a deflecting means and is formed from, for example, a polygon mirror (rotating polyhedral mirror) having a tetrahedral arrangement. The light deflector 5 is rotated by a driving means (not shown) such as a motor at constant speed in the direction indicated by an arrow A in FIG. 1.

A scanning lens system 6 serves as a scanning optical means having a focusing function and f-θ characteristics and is formed from first and second scanning lenses 6a and 6b made of a plastic material. The scanning lens system 6 forms the light beam based on image information, which is reflected/deflected by the light deflector 5, into an image on a photosensitive drum surface 7 serving as a scanning target surface, and has an optical face tangle error correction function of making the deflecting surface 5a of the light deflector 5 and the photosensitive drum surface 7 have a conjugate relationship within a sub-scanning cross-section.

Note that a light beam from the light source means 1 may be directly incident on the light deflector 5 without using the optical elements 2, 3, and 4 described above.

Each of the lens surfaces of the first and second scanning lenses 6a and 6b in this embodiment has a curved surface, i.e., a spherical or aspherical surface within the main scanning cross-section shown in FIG. 1, and also has a known special aspherical surface as a base shape whose curvature changes from an on-axis position (scanning center) to an off-axis position (scanning periphery) within a sub-scanning cross-section perpendicular to the main scanning cross-section. In this embodiment, microstructure lattices 8 made of a transparent resin or glass material (to be described later) are entirely formed on an incident surface 6a1 and exit surface 6a2 of the first scanning lens 6a and an incident surface 6b1 and exit surface 6b2 of the second scanning lens 6b.

In this embodiment, the divergent light beam emitted from the semiconductor laser 1 is converted into a substantially parallel light beam by the collimator lens 2. This light beam (light amount) is then limited by the aperture stop 3 and incident on the cylindrical lens 4. Of the substantially parallel light beam incident on the cylindrical lens 4, the light in a main scanning cross-section emerges without any change. The light in a sub-scanning cross-section is focused and substantially formed into a line image (elongated in the main scanning direction) on the deflecting surface 5a of the light deflector 5. The light beam reflected/deflected by the deflecting surface 5a of the light deflector 5 is formed into a spot on the photosensitive drum surface 7 via the first and second scanning lenses 6a and 6b. This light beam is then scanned on the photosensitive drum surface 7 at constant speed in the direction indicated by an arrow B (main scanning direction) by rotating the light deflector 5 in the direction indicated by the arrow A. With this operation, an image is recorded on the photosensitive drum surface 7 as a recording medium.

In this embodiment, the semiconductor laser 1 serving as a light source is so positioned as to cause light to be incident as almost P-polarized light on the scanning lens system 6. That is, the semiconductor laser 1 is so positioned as to make its transverse mode almost parallel to the photosensitive drum surface 7.

Figure 2:
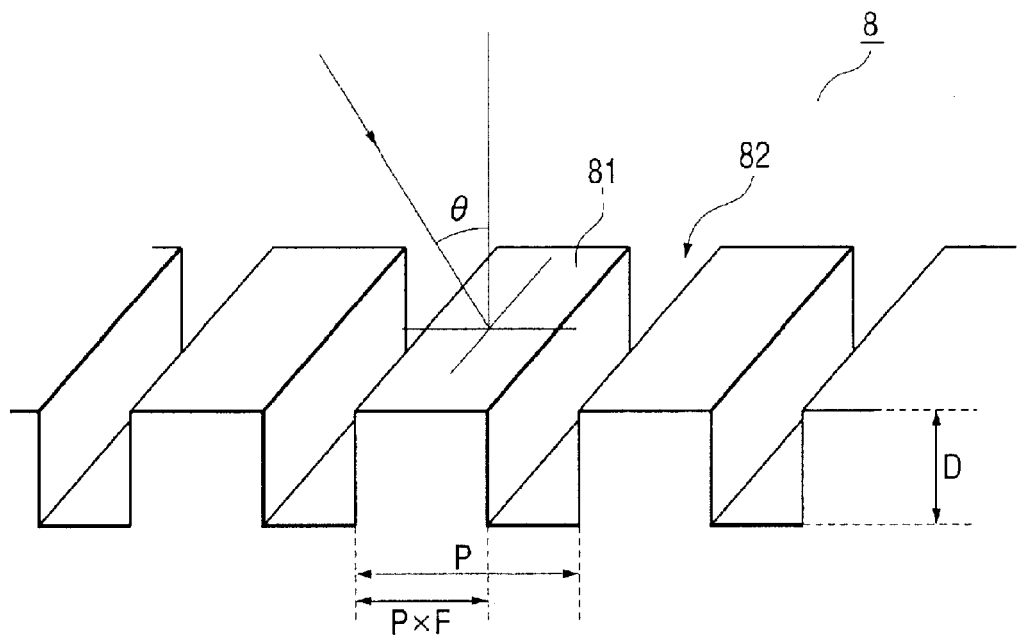
FIG. 2 is a view showing a microstructure lattice in the first embodiment of the present invention.

In this embodiment, as described above, the incident surface 6a1 and exit surface 6a2 of the first scanning lens 6a and the incident surface 6b1 and exit surface 6b2 of the second scanning lens 6b of the scanning optical means 6 have special aspherical surface shapes as base shapes. The microstructure lattice 8 shown in FIG. 2 is entirely formed on each of these surfaces. This makes it possible to arbitrarily control transmission and properly adjust the illuminance distribution on the scanning target surface 7.

In this embodiment, the microstructure lattice 8 may be formed on a given one optical surface (having the highest incidence angle dependency) that most influences the illuminance distribution on the scanning target surface 7. In addition, one or a plurality of microstructure lattices 8 may be formed to make the illuminance distribution on the scanning target surface 7 uniform. The microstructure lattice 8 may be formed on a spherical surface, aspherical surface, rotational asymmetrical curved surface, diffracting surface, mirror surface, or flat surface.

As shown in FIG. 2, the microstructure lattice 8 has a repetitive structure in which pairs of lattice portions 81 and non-lattice portions 82 are arrayed in the one-dimensional direction (main scanning direction). Letting P be a lattice pitch equal to a length of one period of the lattice portion 81 and non-lattice portion 82, and F be a lattice constant, a length L of the lattice portion 81 in the array direction is given by L=F×P. Let D be the depth of the lattice. Note that the microstructure lattice 8 may be integrally formed with a substrate (glass substrate or transparent resin substrate) on which an optical surface is formed.

For the microstructure lattice 8, a lattice pitch P that satisfies a condition for a so-called zero-order lattice is selected. The microstructure lattice 8 is called SWS (subwave structure), which has a lattice pitch $1/10$ to $1/100$ that of a general diffraction grating and is designed to be used for zeroth-order light having no diffracting effect.

A zero-order lattice is a lattice that produces no diffracted light other than zeroth-order light in a periodic microstructure lattice (see Eric B. Grann, et al., "Artificial Uniaxial and Biaxial Dielectrics With Use of Two-Dimensional Subwavelength Binary Gratings," J. Opt. Soc. Am. A, Vol. 11, No. 10, 2695 (October 1994).

In a periodic microstructure lattice, diffracted light is generally produced at a diffraction angle that satisfies the following conditional expression for diffraction:

$$P(N_s \cdot \sin \theta_m - N_i \cdot \sin \theta_i) = m\lambda \quad (1)$$

where P is the lattice pitch, Ni is the refractive index (of the medium of the microstructure lattice) on the incident side, θi is the incidence angle, θm is the m-order diffraction angle, Ns is the refractive index (of the medium of the microstructure lattice) on the light incidence side, m is the diffraction order, and λ is the operating wavelength. As is obvious from conditional expression (1), the diffraction angle is $\theta m \geq \theta_1$ (m=1). According to Optical Society of America, a condition under which no +1st-order diffracted light is produced is defined as, in the case of normal incidence, $$\theta_{+1} \geq 90° \quad (2)$$

Therefore, $$P < \lambda/(Ns + Ni \cdot \sin \theta i) \quad (3)$$

is a condition for a zero-order lattice.

Note that at the most off-axis position, $\theta_{+1}$ becomes 90° or more, and hence the lattice pitch P becomes a smaller pitch Pa. When the incidence angle is other than 0°, the lattice pitch P must be further reduced.

In this embodiment, letting Py be the lattice pitch at a position y from the center of the microstructure lattice 8 through which a light beam reaching a predetermined image height on the photosensitive drum surface 7 passes, $\lambda$ be the wavelength of the light beam from the light source means 1, $\theta i$ be the incidence angle of the light beam at the position y, Ni be the refractive index of the medium of the microstructure lattice 8 on the incident side, and Ns be the refractive index of the medium of the microstructure lattice 8 on the exit side, $$Py < \lambda/(Ns + Ni \cdot \sin \theta i) \quad (4)$$

Figure 3:
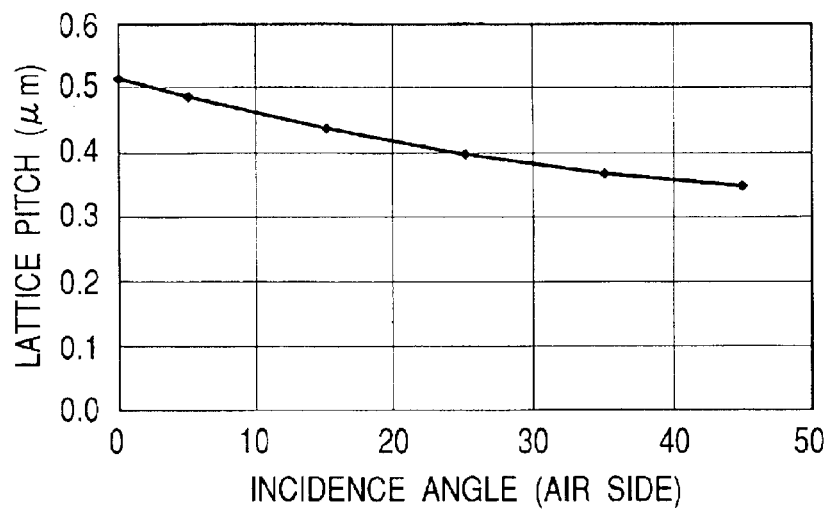
FIG. 3 is a graph showing the relationship between the lattice pitch and the incidence angle in the first embodiment of the present invention.

FIG. 3 is a graph showing how the lattice pitch P changes as the incidence angle $\theta i$ changes when refractive index n (of the material of a lens)=1.524 and operating wavelength $\lambda$=780 nm. This graph shows the maximum pitch that satisfies the condition for a zero-order lattice; no diffracted light other than zeroth-order light is produced below this pitch. It is obvious from this graph that if the lattice pitch P of the microstructure lattice is 0.5 $\mu$m when the incidence angle $\theta i$ is zero, i.e., in the case of normal incidence, the lattice behaves as a zero-order lattice. If, however, the incidence angle $\theta i$ is 45°, the condition for a zero-order lattice is not satisfied when the lattice pitch P of the microstructure lattice is 0.5 $\mu$m. Obviously, when the incidence angle $\theta i$ is 45°, the lattice pitch P for a zero-order lattice must be smaller than 0.35 $\mu$m.

In the scanning optical system according to this embodiment, the incidence angle $\theta i$ of an incident light beam is determined at the position y on each lens surface of the scanning lens system 6, i.e., the incident surface 6a1 and exit surface 6a2 of the first scanning lens 6a and the incident surface 6b1 and exit surface 6b2 of the second scanning lens 6b. Therefore, the maximum pitch that satisfies the condition for a zero-order lattice can be determined at each position on each lens surface.

More specifically, letting Pymax be the lattice pitch determined when a light beam is incident on the microstructure lattice 8 at a maximum incidence angle $\theta$ymax, the microstructure lattice 8 may be formed at the lattice pitch P given by $$P < Py\max \quad (5)$$

If, therefore, maximum incidence angle $\theta$ymax=45°, since Pymax≅0.35 $\mu$m, a pitch equal to or smaller than Pymax may be set as the lattice pitch P.

The above lattice constant F will be described next. It is known that when optically isotropic substance elements, each sufficiently larger than a molecule, are regularly arrayed as particles each smaller than the wavelength of light, a structural birefringence effect appears. According to "Principle of Optics iii", TOKAI UNIVERSITY PRESS, p. 1030, a so-called rectangular lattice having a rectangular cross-section in the array direction of the lattice can be modeled as an assembly of lattice portions 81, non-lattice portions 82, and parallel plates.

It is apparent from this model that different refractive indexes are obtained along two axes, i.e., the lattice array direction and a direction perpendicular to the lattice array, with the lattice constant F and the refractive index of the material of the lattice portions 81 and non-lattice portions 82. If, therefore, the lattice array direction and the polarization direction of a laser used are determined, the lattice constant F can be determined.

Assume that in this embodiment, a microstructure lattice is formed such that the lattice array direction coincides with the polarization direction of a light beam, i.e., each groove of the lattice becomes perpendicular to the polarization direction of a light beam. As described above, the polarization direction of a light beam coincides with P polarization (a direction parallel to the drawing surface of FIG. 1). In order to avoid the influence of structural birefringence, the lattice array direction may be made parallel or perpendicular to the polarization direction of a light beam.

Figure 4:
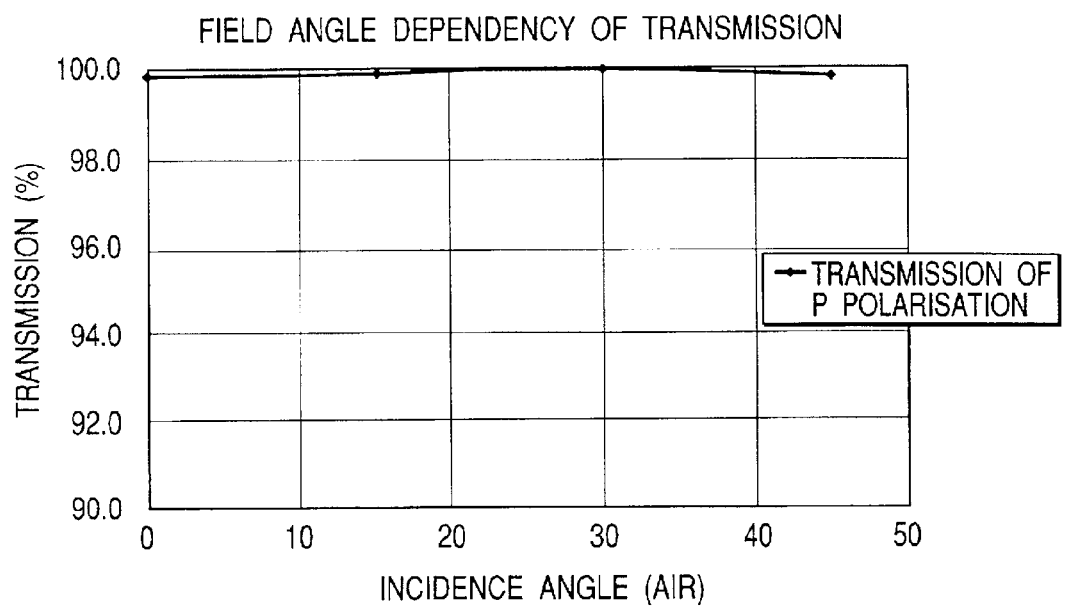
FIG. 4 is a graph showing the relationship between the transmission and the incidence angle in the first embodiment of the present invention.

In this embodiment, the microstructure lattice is optimized to reduce a change in the transmission of P polarization of zeroth-order light regardless of the incidence angle. As a consequence, with operating wavelength $\lambda$=780 nm and refractive index n=1.524 of the material of each scanning lens, the shape of the microstructure lattice is defined as lattice pitch P=0.3 $\mu$m, lattice constant F=0.65, and lattice depth D=0.16 $\mu$m. FIG. 4 shows the transmission characteristic of P polarization with respect to the incidence angle with this lattice shape. In FIG. 4, when the incidence angle of the light beam to be incident to the microstructure lattice is set $\theta$ and the amount of light transmitted on the microstructure lattice surface is set Is($\theta$), $Is(\theta=0)=99.86\%;$ $Is(\theta=30)=99.99\%;$ $Is(\theta=45)=99.81\%;$ and a formula $0.9 < Is(\theta)/Is(0) < 1.1$ are satisfied.

Figure 5:
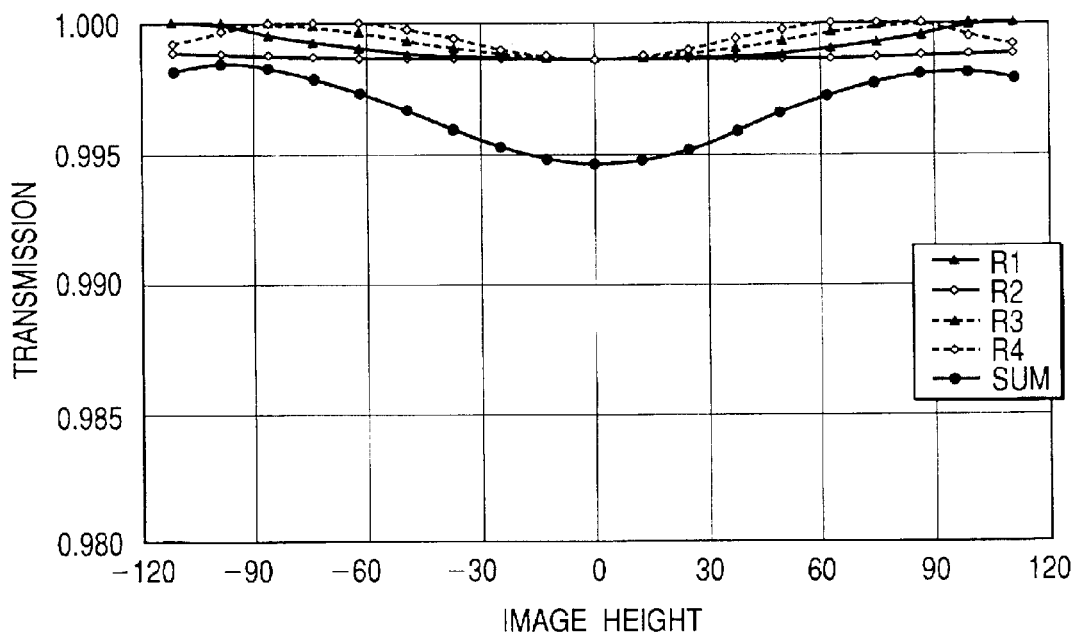
FIG. 5 is a graph showing the relationship between the image height and the transmission in the first embodiment of the present invention.

This microstructure lattice 8 is formed on each optical surface, i.e., the incident surface 6a1 and exit surface 6a2 of the first scanning lens 6a and the incident surface 6b1 and exit surface 6b2 of the second scanning lens 6b. FIG. 5 shows the transmission of each optical surface and the transmission of the overall system in this arrangement.

As shown in FIG. 5, the microstructure lattice 8 formed on each optical surface of the scanning lens means 6 can greatly reduce a change in the amount of light transmitted which is caused as the incidence angle changes from an on-axis position (scanning center) to an off-axis position (scanning periphery). This makes it possible to reduce a change in the total amount of light transmitted in the overall scanning lens means 6 and make the illuminance distribution on the scanning target surface 7 almost uniform.

In this embodiment, a lattice pitch, lattice depth, and lattice constant are determined in accordance with the incidence angle at a position where a light beam reaching a predetermined image height passes through so as to reduce the difference between the amount of light transmitted at an on-axis position (scanning center) and that at an off-axis position (scanning periphery) on each optical surface. This makes it possible to provide a scanning optical system which can keep the illuminance distribution on the scanning target surface 7 almost uniform and output a good image.

Note that at least one factor of a lattice pitch, lattice depth, and lattice constant is determined, the object can almost be achieved.

In this embodiment, each of the lens surfaces of the first and second scanning lenses 6a and 6b has a spherical or aspherical surface within a main scanning cross-section, and also has a known special aspherical surface as a base shape whose curvature changes from an on-axis position to an off-axis position within a sub-scanning cross-section. However, the present invention is not limited to this shape as long as each lens is a so-called f-θ lens having a function (f-θ characteristics) of forming a polarized light beam into a spot on the scanning target surface 7 and scanning it at constant speed.

In this embodiment, the light source means 1 is formed from a single-beam laser. However, the present invention is not limited to this. For example, a composite multi-beam light source may be used, which is formed by combining the optical paths of mono-chip multi-beam or single-beam laser having a plurality of light-emitting portions through a beam combining means and the like.

In this embodiment, the semiconductor laser 1 is so positioned as to cause a light beam to be incident as almost P-polarized light on the scanning lens means 6. However, the present invention is not limited to this. For example, such a light beam may be incident as S-polarized light or an arbitrary polarization direction may be set. In addition, the shape of the microstructure lattice 8 may be optimized in accordance with the polarization direction of a light beam incident on the scanning lens means 6.

In this embodiment, the lattice shape obtained by arraying rectangular cross-sections in a one-dimensional direction has been exemplified. However, the present invention is not limited to this. This shape may be optimized by using triangular, trapezoidal, or wavy cross-sections and arraying them in a two-dimensional direction as well as in a one-dimensional direction.

As a method of forming a microstructure lattice on a lens surface, a technique of forming the shape of a microstructure lattice in an injection mold and molding a microstructure lattice.

In this embodiment, the scanning lens means 6 is comprised of two lenses. However, the present invention is not limited to this. For example, this means may be formed from a single or three or more lenses.

(Second Embodiment)

Figure 6:
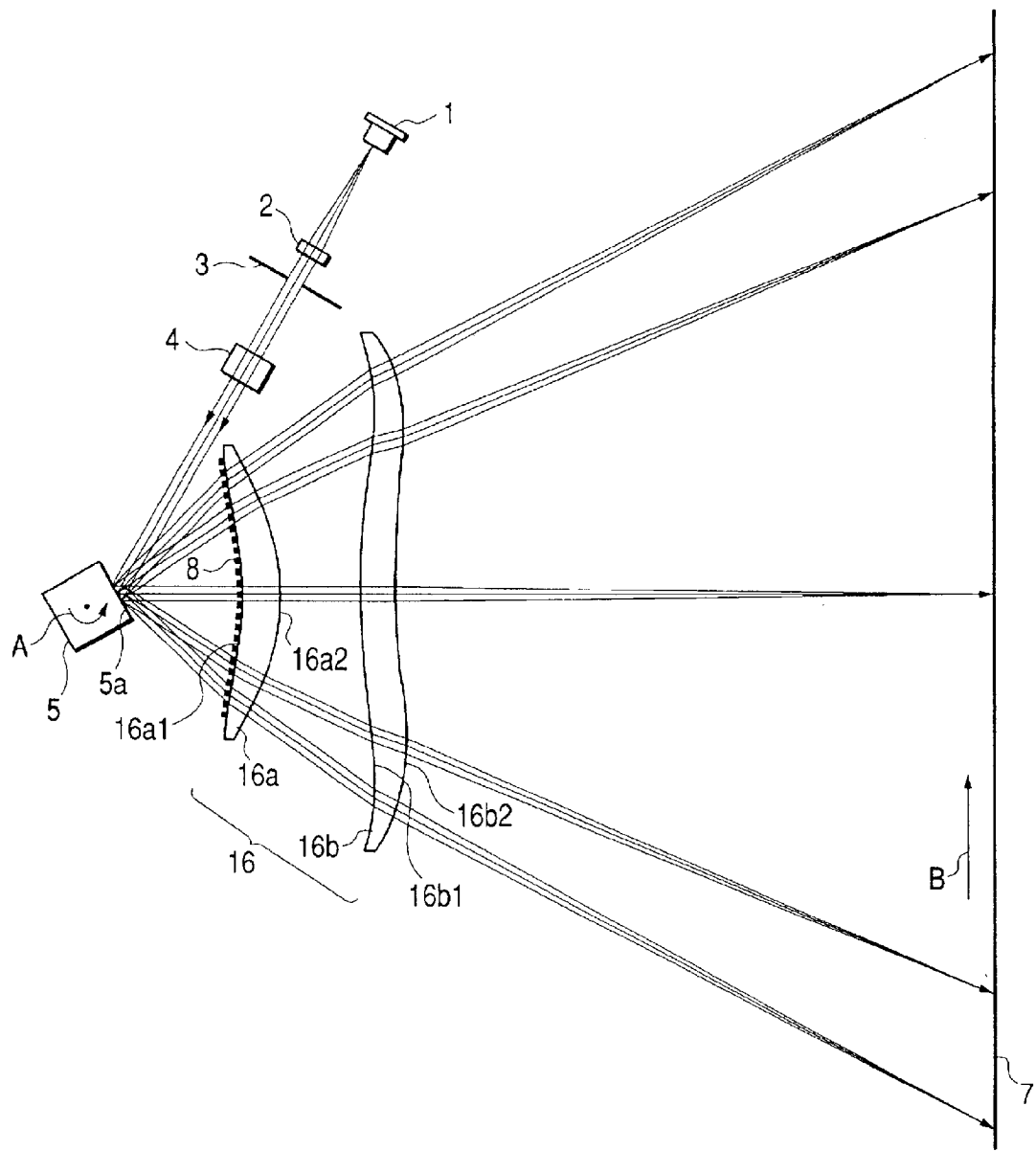
FIG. 6 is a sectional view of the second embodiment of the present invention in the main scanning direction.

FIG. 6 is a sectional view (main scanning cross-section) of the main part of the second embodiment of the present invention in the main scanning direction. The same reference numerals as in FIG. 1 denote the same parts in FIG. 6.

This embodiment differs from the first embodiment in that a microstructure lattice 8 is formed on only an incident surface 16*a*1 of a first lens 16*a* of a scanning optical means 16. Other arrangements and optical effects are the same as those in the first embodiment, and hence the same effects as those of the first embodiment are obtained.

Referring to FIG. 6, the scanning lens system 16 serves as a scanning optical means having a focusing function and f-θ characteristics. The scanning optical means 16 is formed from two scanning lenses, i.e., first and second lenses 16*a* and 16*b*, made of a plastic material. The scanning lens means 16 forms the light beam based on image information, which is reflected/deflected by a light deflector 5, into an image on a photosensitive drum surface 7 serving as a scanning target surface, and has an optical face tangle error correction function of making a deflecting surface 5*a* of the light deflector 5 and the photosensitive drum surface 7 have a conjugate relationship within a sub-scanning cross-section.

In this embodiment, each of the lens surfaces of the first and second scanning lenses 16*a* and 16*b* has a curved surface, i.e., a spherical or aspherical surface within a main scanning cross-section in FIG. 6, and also has a known special aspherical surface as a base shape whose curvature changes from an on-axis (scanning center) position to an off-axis position (scanning periphery) within a sub-scanning cross-section.

In this embodiment, as described above, the microstructure lattice 8 is formed on only the incident surface 16*a*1 of the first lens 16*a* of the scanning optical means 16.

The shape of the microstructure lattice in this embodiment is set as follows, with operating wavelength λ=780 nm and refractive index n=1.524.

A lattice pitch P is set to P=0.3 μm for the same reason as that described in the first embodiment. In addition, as in the first embodiment, a lattice depth D is set to D=0.16 μm.

Figure 7:
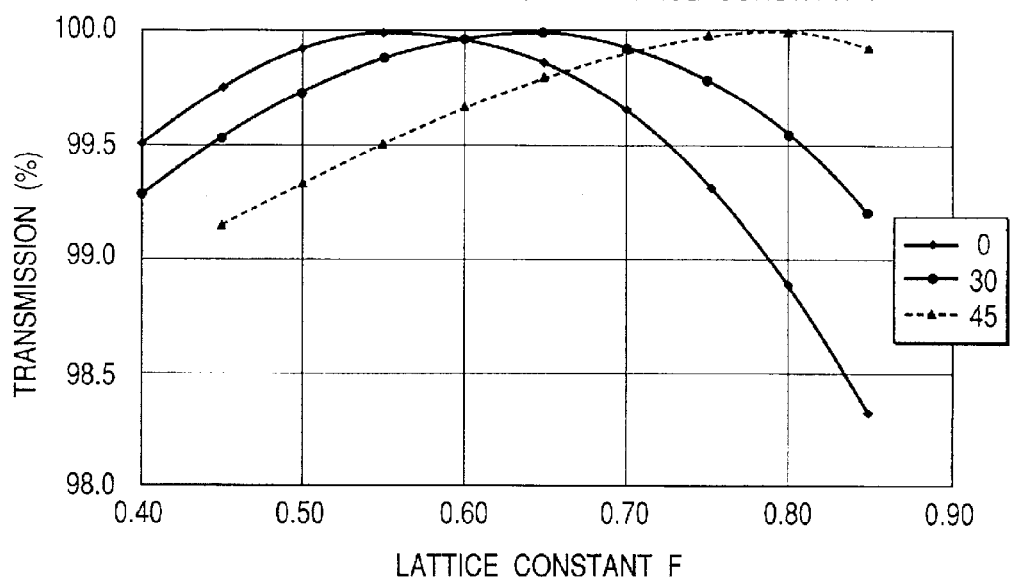
FIG. 7 is a graph showing the relationship between the lattice and the transmission in the second embodiment of the present invention.

A lattice constant F is set as follows. FIG. 7 shows the result obtained by checking the relationship between the lattice constant F of the microstructure lattice 8 and the amount of light transmitted through the zero-order lattice with incidence angle θi=0°, 30°, and 45°. According to this result, if the incidence angle θi is determined, an arbitrary transmission can be obtained by appropriately setting the lattice constant F.

In the scanning optical system according to this embodiment, the incidence angle θi of a light beam is determined at a position y on the lens surface of the incident surface 16*a*1 of the first lens 16*a* of the scanning optical means 16. It suffices if the amount of light transmitted (transmission) through the incident surface 16*a*1 of the first lens 16*a* is determined on this result to make the total amount of light transmitted through the scanning optical means 16 at an arbitrary image height almost constant. That is, the lattice constant F may be optimized in correspondence with the incidence angle θi such that a desired transmission is set at the position y on the incident surface 16*a*1 of the first lens 16*a*.

In other words, an optimal transmission can be set by setting different lattice constants F at an on-axis position (scanning center) and off-axis position (scanning periphery) on the microstructure lattice 8 in accordance with the incidence angle at the position where a light beam reaching a predetermined image height passes through the microstructure lattice 8.

Figure 8:
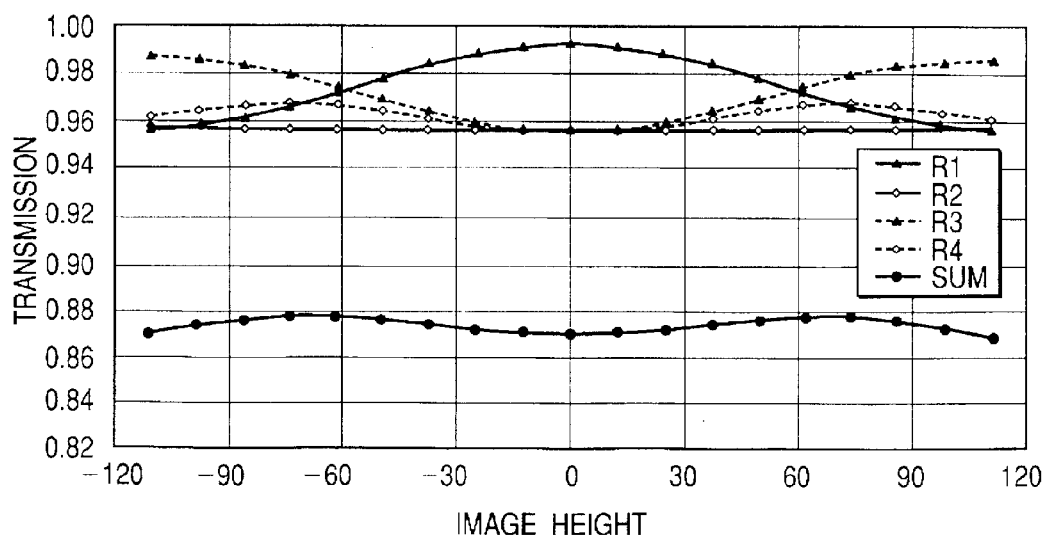
FIG. 8 is a graph showing the relationship between the image height and the transmission in the second embodiment of the present invention.

FIG. 8 shows the result obtained by optimization according to the above procedure. FIG. 8 shows the transmission of each of optical surfaces including the incident surface 16*a*1 and exit surface 16*a*2 of the first lens 16*a* and the incident surface 16*b*1 and exit surface 16*b*2 of the scanning lens 16*b* and the transmission of the overall system.

As is obvious from FIG. 8, letting θ be the scanning angle of a deflected light beam corresponding to an arbitrary image height, Id(θ) be the amount of light transmitted through the microstructure lattice 8 on the incident surface 16*a*1 of the first lens 16*a* of the scanning optical means 16 at the scanning angle θ, and It(θ) be the total amount of light transmitted through the respective optical surfaces other than the surface on which the microstructure lattice 8 is formed, i.e., the exit surface 16*a*2 of the first lens 16*a* and the incident surface 16*b*1 and exit surface 16*b*2 of the scanning lens 16*b* at the scanning angle θ, the following inequality is satisfied within the scanning angle:

$$0.8 < (Id(\theta) \times It(\theta))/(Id(0) \times It(0)) < 1.2 \qquad (6)$$

The illuminance distribution on the scanning target surface 7 can be kept almost uniform by making settings such that a change in the amount of light transmitted which is caused as the incidence angle changes from an on-axis position (scanning center) to an off-axis position (scanning periphery) on the microstructure lattice 8 of the scanning optical means 16 cancels out a change in the total amount of light transmitted which is caused as the incidence angle changes from an on-axis position to an off-axis position on each optical surface other than the optical surface on which the microstructure lattice 8 is formed. This makes it possible to provide a scanning optical system which can output a good image.

Note that a change in the total amount of light transmitted through the scanning optical means 16 is based on the transmission originating from a change in the incidence angle of a light beam from a scanning center to a scanning periphery on a refracting surface.

As described above, in this embodiment, the illuminance distribution on the scanning target surface 7 is made almost uniform by making the field angle characteristic of the antireflection function of the microstructure lattice 8 cancel out the field angle characteristic based on the transmission from an on-axis position to an off-axis position on each optical surface other than the optical surface on which the microstructure lattice 8 is formed.

In this embodiment, the microstructure lattice 8 is set on the incident surface 16a1 of the first lens 16a of the scanning optical means 16. However, the present invention is not limited to this. A microstructure lattice may be set on another optical surface as in the embodiment described later, or microstructure lattices may be set on a plurality of optical surfaces.

(Third Embodiment)

Figure 9:
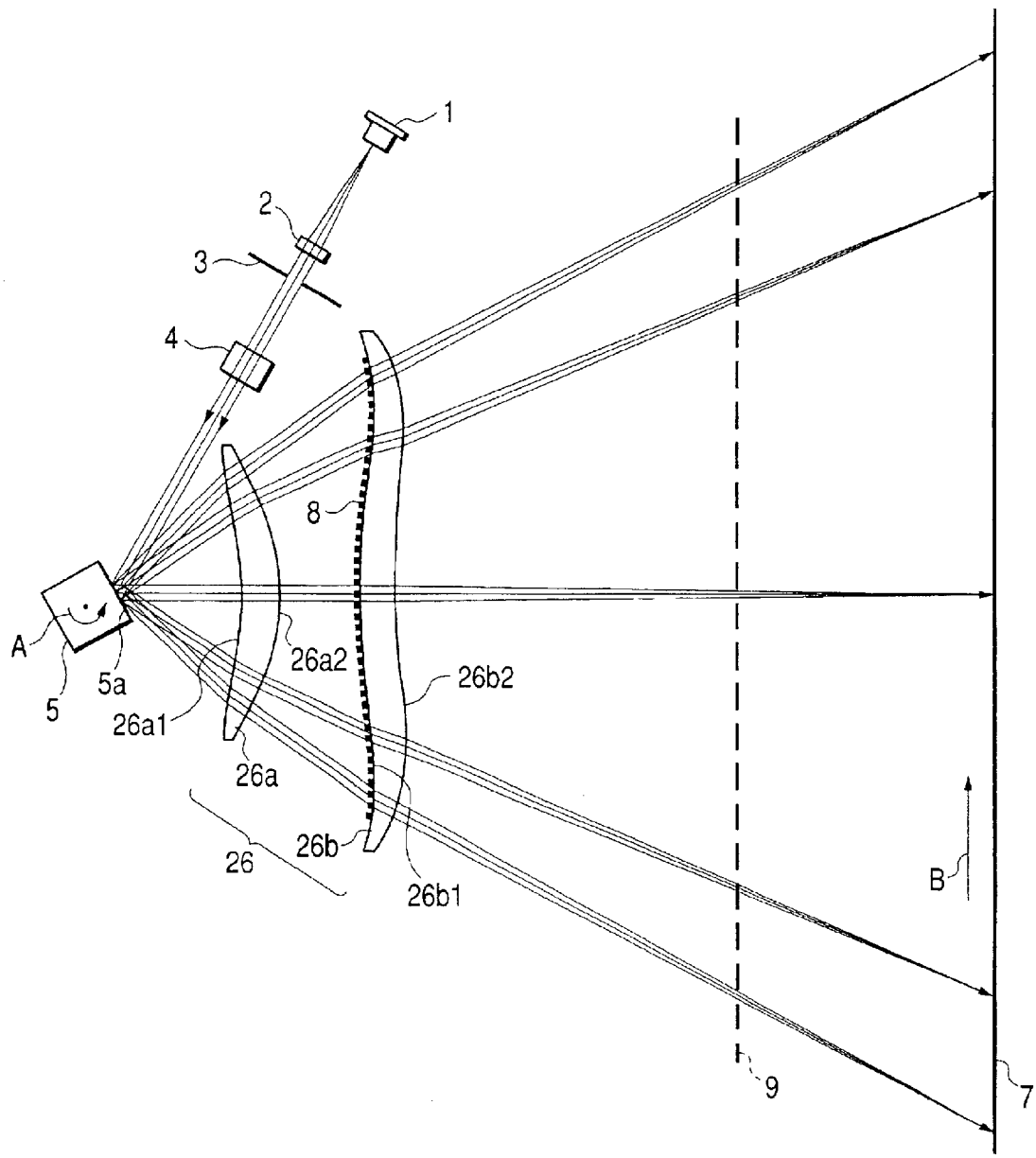
FIG. 9 is a sectional view of the third embodiment of the present invention in the main scanning direction.
Figure 10:
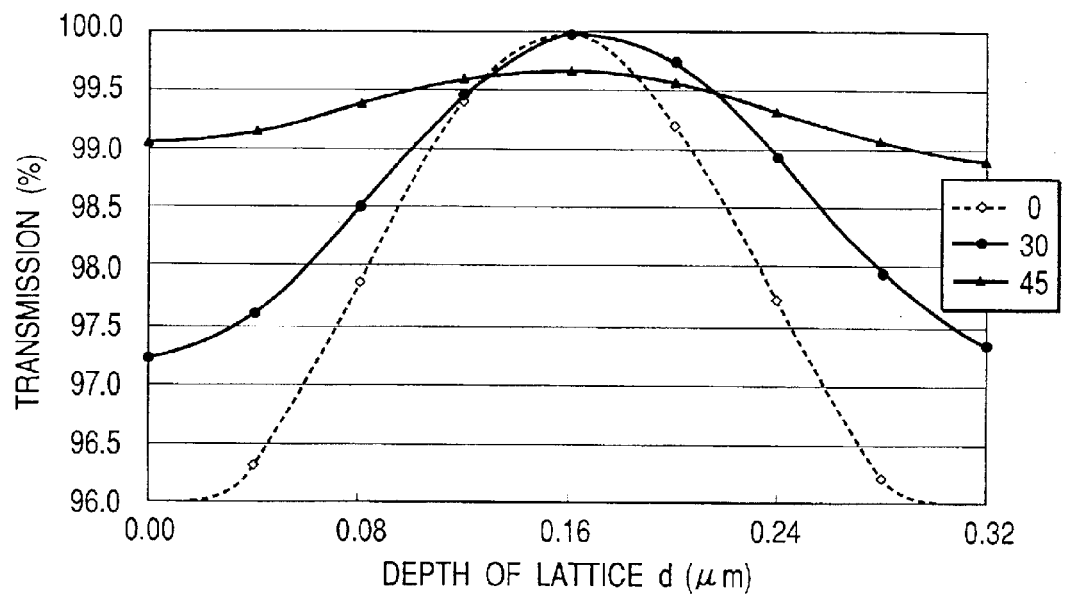
FIG. 10 is a graph showing the relationship between the lattice depth and the transmission in the third embodiment of the present invention.

FIG. 9 is a sectional view (main scanning cross-section) showing the main part of the third embodiment of the present invention in the main scanning direction. The same reference numerals as in FIG. 1 denote the same parts in FIG. 9.

This embodiment differs from the first embodiment in that a microstructure lattice 8 is formed on only an incident surface 26b1 of a second lens 26b of a scanning optical means 26, and an optical path folding mirror 9 is placed between the second lens 26b and a scanning target surface 7. Other arrangements and optical effects are the same as those in the first embodiment, and hence the same effects as those of the first embodiment are obtained.

Referring to FIG. 9, the scanning lens system 26 serves as a scanning optical means having a focusing function and f-θ characteristics. The scanning optical means 26 is formed from two scanning lenses, i.e., first and second lenses 26a and 26b, made of a plastic material. The scanning lens means, 16 forms the light beam based on image information, which is reflected/deflected by a light deflector 5, into an image on a photosensitive drum surface 7 serving as a scanning target surface, and has an optical face tangle error correction function of making a deflecting surface 5a of the light deflector 5 and the photosensitive drum surface 7 have a conjugate relationship within a sub-scanning cross-section.

In this embodiment, each of the lens surfaces of the first and second scanning lenses 26a and 26b has a curved surface, i.e., a spherical or aspherical surface within a main scanning cross-section in FIG. 9, and also has a known special aspherical surface as a base shape whose curvature changes from an on-axis (scanning center) position to an off-axis position (scanning periphery) within a sub-scanning cross-section.

In this embodiment, as described above, the microstructure lattice 8 is formed on only the incident surface 26b1 of the first lens 26b of the scanning optical means 26.

The shape of the microstructure lattice in this embodiment is set as follows, with operating wavelength λ=780 nm and refractive index n=1.524.

A lattice pitch P is set to P=0.3 μm for the same reason as that described in the first embodiment. In addition, as in the first embodiment, a lattice depth constant F is set to F=0.65.

Figure 11:
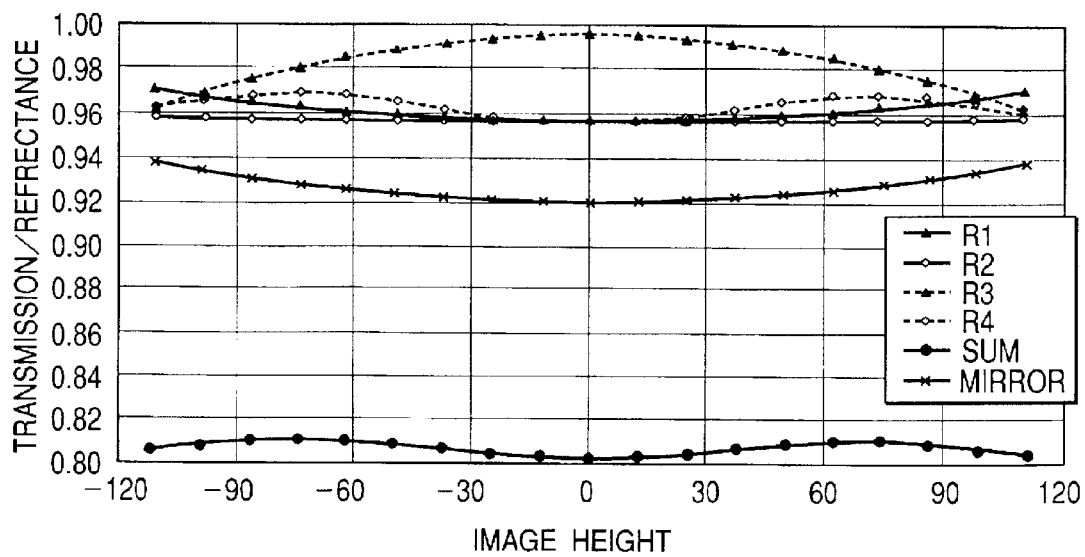
FIG. 11 is a graph showing the relationship between the image height and the transmission in the third embodiment of the present invention.

A lattice depth D is set as follows. FIG. 11 shows the result obtained by checking the relationship between the lattice depth D of the microstructure lattice 8 and the amount of light transmitted through the zero-order lattice with incidence angle θi=0°, 30°, and 45°. According to this result, if the incidence angle θi is determined, an arbitrary transmission can be obtained by appropriately setting the lattice depth D.

In the scanning optical system according to this embodiment, the incidence angle θi of a light beam is determined at a position y on the lens surface of the incident surface 26b1 of the second lens 26b of the scanning optical means 26. It suffices if the amount of light transmitted (transmission) through the incident surface 26b1 of the second lens 26b is determined on this result to make the total amount of light transmitted through the scanning optical means 26 at an arbitrary image height almost constant. That is, the lattice depth D may be optimized in correspondence with the incidence angle θi such that a desired transmission is set at the position y on the incident surface 26b1 of the second lens 26b.

In other words, an optimal transmission can be set by setting different lattice depths D at an on-axis position (scanning center) and off-axis position (scanning periphery) on the microstructure lattice 8 in accordance with the incidence angle at the position where a light beam reaching a predetermined image height passes through the microstructure lattice 8.

FIG. 11 shows the result obtained by optimization according to the above procedure. FIG. 11 shows the transmission of each of optical surfaces including the incident surface 26a1 and exit surface 26a2 of the first lens 26a and the incident surface 26b1 and exit surface 26b2 of the scanning lens 26b, the reflectance of the optical surface of the optical path folding mirror 9, and the transmission of the overall system.

As is obvious from FIG. 11, letting θ be the scanning angle of a deflected light beam corresponding to an arbitrary image height, $Id(\theta)$ be the amount of light transmitted through the microstructure lattice 8 on the incident surface 26b1 of the second lens 26b of the scanning optical means 26 at the scanning angle θ, and $It(\theta)$ be the total amount of light transmitted at the scanning angle θ, which is calculated from the transmissions of the respective optical surfaces other than the surface on which the microstructure lattice 8 is formed, i.e., the incident surface 26a1 and exit surface 26a2 of the first lens 26a and the exit surface 26b2 of the second lens 26b and the reflectance of the reflecting surface of the optical path folding mirror 9, the following inequality is satisfied within the scanning angle:

$$0.8 < (Id(\theta) \times It(\theta))/(Id(0) \times It(0)) < 1.2 \qquad (6)$$

The illuminance distribution on the scanning target surface 7 can be kept almost uniform by making settings such that a change in the amount of light transmitted which is caused as the incidence angle changes from an on-axis position (scanning center) to an off-axis-position (scanning periphery) on the microstructure lattice 8 of the scanning optical means 26 cancels out a change in the total amount of light transmitted which is caused as the incidence angle changes from an on-axis position to an off-axis position on each optical surface other than the optical surface on which the microstructure lattice 8 is formed. This makes it possible to provide a scanning optical system which can output a good image.

In the above scanning optical means 26, a change in the total amount of light beam transmitted through the scanning optical means 26 originates from a change in transmission which is caused as the incidence angle of a light beam changes from a scanning center to a scanning periphery on a refracting surface and a change in reflectance which is caused by a change in the incidence angle of a light beam from a scanning center to a scanning periphery on a reflecting surface.

In addition, in this embodiment, the microstructure lattice 8 is set on the incident surface 26b1 of the second lens 26b of the scanning optical means 26. However, the present invention is not limited to this. A microstructure lattice may be set on the optical surface of an optical path folding mirror having a plane diffracting or reflecting surface, or microstructure lattices may be set on a plurality of optical surfaces.

In the second and third embodiments, the transmission is optimized by setting different lattice constants F or lattice depths D at an on-axis position (scanning center) and an off-axis position (scanning periphery) on the microstructure lattice 8 in accordance with the incidence angle at the position where a light beam reaching a predetermined image height passes through the microstructure lattice 8. However, the present invention is not limited to this. For example, different lattice pitches P, lattice depths D, and lattice constants F may be set altogether.

(Image Forming Apparatus)

Figure 12:
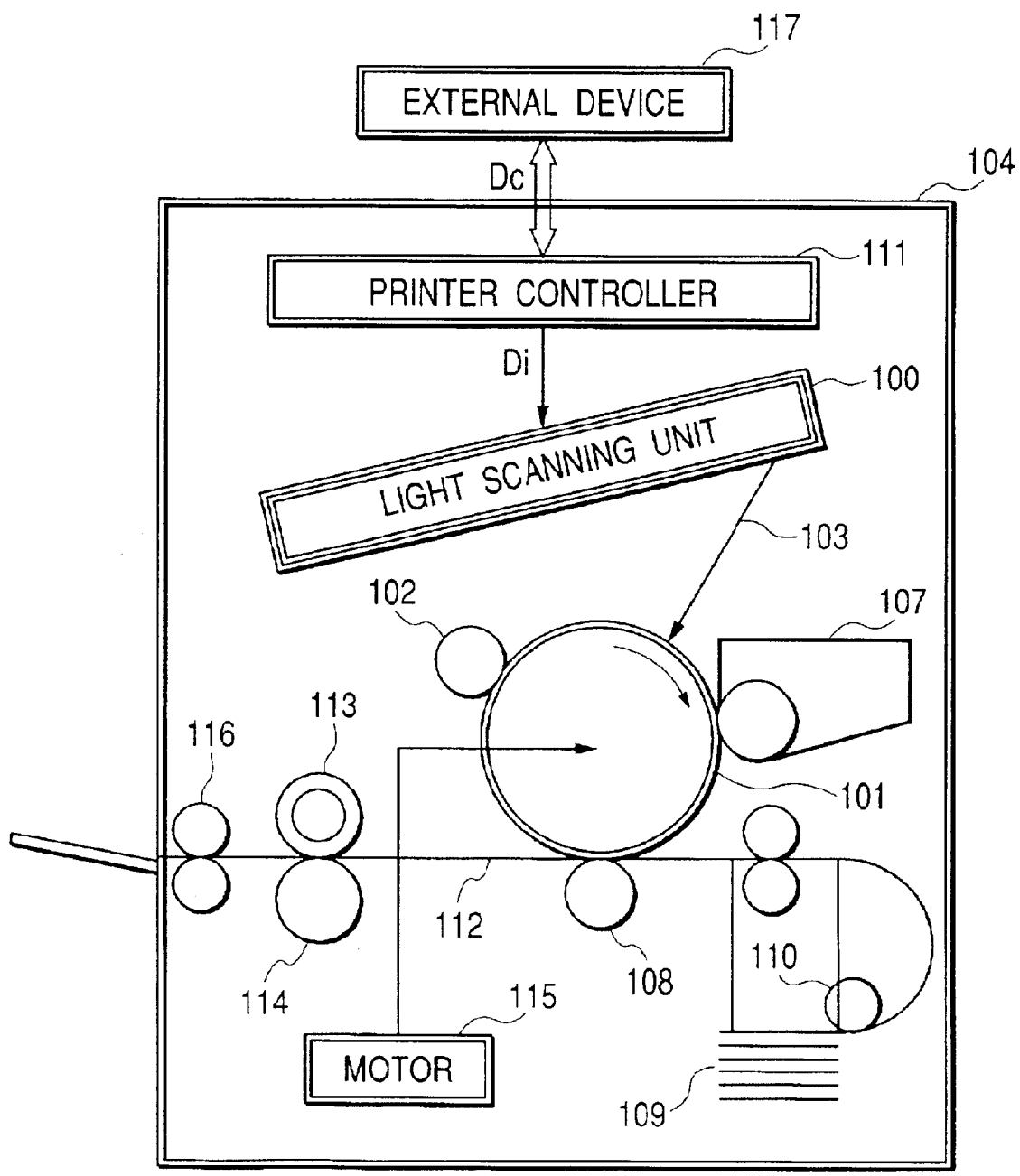
FIG. 12 is a sectional view of an arrangement of an image forming apparatus (electrophotographic printer) using a scanning optical system according to the present invention in the sub-scanning direction.
Figure 13:
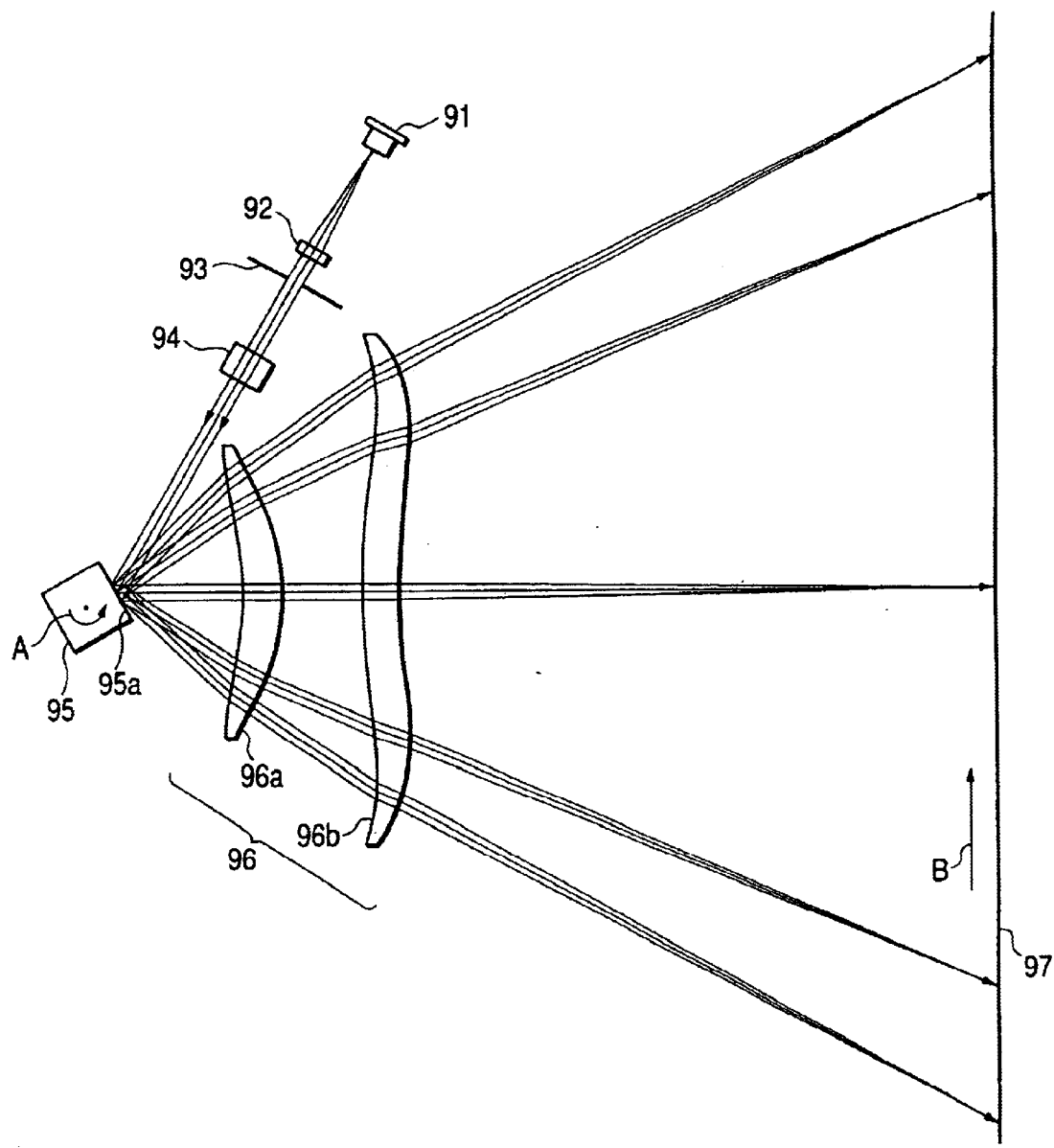
FIG. 13 is a sectional view of a conventional scanning optical system in the main scanning direction.

FIG. 12 is a sectional view showing the main part of an image forming apparatus (electrophotographic printer) in a sub-scanning cross-section, which uses the scanning optical system according to the first, second, or third embodiment described above. Referring to FIG. 12, an image forming apparatus 104 receives code data Dc from an external device 117 such as a personal computer. This code data Dc is converted into image data (dot data) Di by the printer controller 111 in the apparatus. The image data Di is input to an optical scanning unit 100 having the arrangement exemplified by each of the first, second, and third embodiments. A light beam 103 modulated in accordance with the image data Di emerges from the optical scanning unit (scanning optical system) 100. The photosensitive surface of a photosensitive drum 101 is scanned with this light beam 103 in the main scanning direction.

The photosensitive drum 101 serving as an electrostatic latent image bearing member is rotated clockwise by a motor 115. With this rotation, the photosensitive surface of the photosensitive drum 101 moves in the sub-scanning direction perpendicular to the main scanning direction. A charge roller 102 is placed above the surface of the photosensitive drum 101 to be in contact with its surface so as to uniformly charge it. The surface of the photosensitive drum 101 charged by the charge roller 102 is irradiated with the light beam 103 scanned by the optical scanning unit 100.

As described, the light beam 103 is modulated on the basis of the image data Di. By irradiating the surface of the photosensitive drum 101 with this light beam 103, an electrostatic latent image is formed on the surface. This electrostatic latent image is developed into a toner image by a developing device 107 placed downstream from the irradiation position of the light beam 103 within a rotating cross-section of the photosensitive drum 101 so as to be in contact with the photosensitive drum 101.

The toner image developed by the developing device 107 is transferred onto a paper sheet 112 serving as a transfer member by a transferring roller (transferring device) 108.

The paper sheet 112 is stored in a paper cassette 109 in front of the photosensitive drum 101 (on the right side in FIG. 12). However, a paper sheet can also be fed manually. A pickup roller 110 is placed at an end portion of the paper cassette 109 to feed the paper sheet 112 from the paper cassette 109 into a convey path.

In the above manner, the paper sheet 112 on which the unfixed toner image is transferred is conveyed to a fixing device behind the photosensitive drum 101 (on the left side in FIG. 12). The fixing device is constituted by a fixing roller 113 incorporating a fixing heater (not shown) and a press roller 114 placed in contact with the fixing roller 113. The fixing device fixes the unfixed toner image on the paper sheet 112 by heating the paper sheet 112 conveyed from the transferring unit while pressing it between the fixing roller 113 and the press portion of the press roller 114. Furthermore, the image-fixed paper sheet 112 is discharged from the image forming apparatus by using a sheet discharging roller 116 placed behind the fixing roller 113.

Although not shown in FIG. 12, the printer controller 111 controls the respective units in the image forming apparatus including the motor 115 and the polygon motor in the optical scanning unit 100 as well as the data conversion described above.

According to the present invention, as described above, the optical element having the microstructure lattice designed to adjust a change in the amount of light transmitted which is caused as the incidence angle of a light beam changes from the central portion to the peripheral portion is applied to the scanning optical system to implement an optical element which can easily adjust the amount of light transmitted which is caused as the incidence angle of a light beam changes and a scanning optical system having the optical element.

In addition, according to the present invention, an optical element which can make the light amount distribution on the scanning target surface uniform by reducing Fresnel reflection on the lens surface which causes flare or ghost without increasing a step such as a coating step, and an optical system having the optical element can be implemented.

Furthermore, according to the present invention, as described above, an optical element which can make the illuminance distribution almost uniform in a wide area on an image surface and an optical system using the optical element can be implemented.

What is claimed is:

1. A scanning optical element having a microstructure lattice formed on at least one optical surface, wherein said microstructure lattice is a zero-order lattice; and wherein letting $\theta$ be a scanning angle, $Id(\theta)$ be the total amount of light transmitted through said microstructure lattice at the scanning angle $\theta$, and $It(\theta)$ be the total amount of light transmitted, at the scanning angle $\theta$, through an optical surface other than the optical surface on which said microstructure lattice is formed, $$0.8 < (Id(\theta) \times It(\theta))/(Id(0) \times It(0)) < 1.2$$

is satisfied within all of the scanning angle.

2. An optical element according to claim 1, wherein the optical surface is a lens surface, diffracting surface, or mirror surface, and comprises a flat or curved surface.

3. An optical element according to claim 1, wherein said microstucture lattice is integrally formed with a substrate on which the optical surface is formed.

4. An optical element according to claim 1, wherein the arrangement for collecting the change in the amount of light transmitted is based on at least one of a lattice pitch, lattice depth, and lattice constant of said microstructure lattice.

5. An optical element according to claim 1, wherein a material for said microstructure lattice is a transparent resin or glass material.

6. A scanning optical system for deflecting a light beam emitted from light source means by using deflecting means, guiding the light beam deflected by said deflecting means onto a scanning surface by using scanning optical means, wherein said scanning optical means includes an optical element having a microstructure lattice formed on at least one optical surface, wherein said microstructure lattice is a zero-order lattice; and wherein letting θ be a scanning angle, Id(θ) be the total amount of light transmitted through said microstructure lattice at the scanning angle θ, and It(θ) be the total amount of light transmitted, at the scanning angle θ, through an optical surface other than the optical surface on which said microstructure lattice is formed, $$0.8<(Id(\theta)\times It(\theta))/(Id(0)\times It(0))<1.2$$

is satisfied within all of the scanning angle.

7. A scanning optical system according to claim 6, wherein the optical surface on which said microstructure lattice is formed is a surface, of optical surfaces of said scanning optical means, which exhibits a largest change in incidence angle due to a field angle.

8. A scanning optical system according to claim 6, wherein each optical surface other than the surface on which said microstructure lattice is formed is formed from a refracting surface or/and a reflecting surface, and the change in the total amount of light beam transmitted said scanning optical means is based on a transmission produced when an incidence angle of a light beam changes from a scanning center to a scanning periphery on the refracting surface or/and a reflectance produced when an incidence angle of a light beam changes from a scanning center to a scanning periphery on the reflecting surface.

9. A scanning optical system for deflecting a light beam emitted from light source means by using deflecting means, guiding the light beam deflected by said deflecting means onto a scanning surface by using scanning optical means, wherein said scanning optical means includes an optical element having a microstructure lattice formed on at least one optical surface, and wherein said microstructure lattice is configured such that a direction of change in the total amount of light transmitted changing from a scanning center of an optical surface on which said microstructure lattice is provided to a scanning periphery is opposite to a direction of change in the total amount of light transmitted changing from a scanning center of an optical surface on which said microstructure lattice is not provided to a scanning periphery.

10. A scanning optical system for deflecting a light beam emitted from light source means by using deflecting means, guiding the light beam deflected by said deflecting means onto a scanning surface by using scanning optical means, and scanning the scanning surface, wherein said microstructure lattice is formed on all optical surfaces of said scanning optical means; and wherein letting θ be a scanning angle, Id(θ) be the total amount of light transmitted through said microstructure lattice at the scanning angle θ, and It(θ) be the total amount of light transmitted, at the scanning angle θ, through an optical surface other than the optical surface on which said microstructure lattice is formed, $$0.8<(Id(\theta)\times It(\theta))/(Id(0)\times It(0))<1.2$$

is satisfied within all of the scanning angle.

11. A scanning optical system for deflecting a light beam emitted from light source means by using deflecting means, guiding the light beam deflected by said deflecting means onto a scanning surface by using scanning optical means, wherein said scanning optical means includes an optical element having a microstructure lattice formed on at least one optical surface, and $$Py<\lambda/(Ns+Ni\cdot\sin\theta i)$$

is satisfied, where Py is a lattice pitch at a position y from a center at which a light beam reaching a predetermined image height on the scanning surface passes through said microstructure lattice, λ is a wavelength of a light beam from the light source means, θi is an incidence angle of a light beam at the position y, Ni is a refractive index of a medium on an incident side of said microstructure lattice, and Ns is a refractive index of a medium on an exit side of said microstructure lattice; and wherein letting θ be a scanning angle, Id(θ) be the total amount of light transmitted through said microstructure lattice at the scanning angle θ, and It(θ) be the total amount of light transmitted, at the scanning angle θ, through an optical surface other than the optical surface on which said microstructure lattice is formed, $$0.8<(Id(\theta)\times It(\theta))/(Id(0)\times It(0))<1.2$$

is satisfied within all of the scanning angle.

12. A scanning optical system according to claim 11, wherein in order to reduce a light amount difference between a scanning center and a scanning periphery on scanning surface, at least one of a lattice pitch, lattice depth, and lattice constant is determined for said microstructure lattice in accordance with an incidence angle at a position where a light beam reaching a predetermined image height passes through said microstructure lattice.

13. A scanning optical system according to claim 11, wherein letting Pymax be a lattice pitch determined when a maximum incidence angle of a light beam incident on said microstructure lattice is set to θymax, said microstructure lattice is formed at a pitch P given by $$P<Pymax.$$

14. A scanning optical system according to claim 11, wherein at least one of a lattice pitch, lattice depth, and lattice constant is changed at a scanning center and a scanning periphery on said microstructure lattice in accordance with an incidence angle at a position where a light beam reaching a predetermined image height passes through said microstructure lattice.

15. A scanning optical system according to claim 11, wherein the optical surface on which said microstructure lattice is formed is a surface, of optical surfaces of said scanning optical means, which exhibits a largest change in incidence angle due to a field angle.

16. A scanning optical system according to claim 11, wherein said microstructure lattice is configured such that a direction of change in the total amount of light transmitted changing from a scanning center of an optical surface on which said microstructure lattice is provided to a scanning periphery is opposite to a direction of change in the total amount of light transmitted changing from a scanning center of an optical surface on which said microstructure lattice is not provided to a scanning periphery.

17. A scanning optical system according to claim 11, wherein said microstructure lattice is formed on all optical surfaces of said scanning optical means.

18. A scanning optical system according to claim 11, wherein said microstructure lattice is formed on an optical surface which is a spherical surface, aspherical surface, rotational asymmetrical curved surface, or diffracting surface.

19. A scanning optical system according to claim 11, wherein said microstructure lattice is formed on a flat optical surface.

20. A scanning optical system according to claim 11, wherein a material for said microstructure lattice is a transparent resin or glass material.

21. A scanning optical system according to claim 11, wherein, when the incidence angle of the light beam to be incident to said microstructure lattice is set $\theta$ and an amount of light transmitted on said microstructure lattice surface is set $Is(\theta)$, $$0.9 < Is(\theta)/Is(0) < 1.1$$

is satisfied.

22. A scanning optical element having a microstructure lattice formed on at least one optical surface,
wherein, when the incidence angle of the light beam to be incident to said microstructure lattice is set $\theta$ and an amount of light transmitted on said microstructure lattice surface is set $Is(\theta)$, $$0.9 < Is(\theta)/Is(0) < 1.1$$

is satisfied.

23. A scanning optical system for deflecting a light beam emitted from light source means by using deflecting means, guiding the light beam deflected by said deflecting means onto a scanning the scanning surface,
wherein said scanning optical means includes an optical element having a microstructure lattice formed on at least one optical surface, and
wherein, when the incidence angle of the light beam to be incident to said microstructure lattice is set $\theta$ and an amount of light transmitted on said microstructure lattice surface is set $Is(\theta)$, $$0.9 < Is(\theta)/Is(0) < 1.1$$

is satisfied.

24. A scanning optical system for deflecting a light beam emitted from light source means by using deflecting means, guiding the light beam deflected by said deflecting means onto a scanning surface by using scanning optical means,
wherein said scanning optical means includes an optical element having a microstructure lattice formed on at least one optical surface, and $$Py < \lambda/(Ns + Ni \cdot \sin\theta i)$$

is satisfied, where Py is a lattice pitch at a position y from a center at which a light beam reaching a predetermined image height on the scanning surface passes through said microstructure lattice, $\lambda$ is a wavelength of a light beam from the light source means, $\theta i$ is an incidence angle of a light beam at the position y, Ni is a refractive index of a medium on an incident side of said microstructure lattice, and Ns is a refractive index of a medium on an exit side of said microstructure lattice; and
wherein said microstructure lattice is configured such that a direction of change in the total amount of light transmitted changing from a scanning center of an optical surface on which said microstructure lattice is provided to a scanning periphery is opposite to a direction of change in the total amount of light transmitted changing from a scanning center of an optical surface on which said microstructure lattice is not provided to a scanning periphery.

25. A scanning optical system for deflecting a light beam emitted from light source means by using deflecting means, guiding the light beam deflected by said deflecting means onto a scanning surface by using scanning optical means,
wherein said scanning optical means includes an optical element having a microstructure lattice formed on at least one optical surface, and $$Py < \lambda/(Ns + Ni \cdot \sin\theta i)$$

is satisfied, where Py is a lattice pitch at a position y from a center at which a light beam reaching a predetermined image height on the scanning surface passes through said microstructure lattice, $\lambda$ is a wavelength of a light beam from the light source means, $\theta i$ is an incidence angle of a light beam at the position y, Ni is a refractive index of a medium on an incident side of said microstructure lattice, and Ns is a refractive index of a medium on an exit side of said microstructure lattice; and
wherein, when the incidence angle of the light beam to be incident to said microstructure lattice is set $\theta$ and an amount of light transmitted on said microstructure lattice surface is set $Is(\theta)$, $$0.9 < Is(\theta)/Is(0) < 1.1$$

is satisfied.

26. An image forming apparatus comprising:
a scanning optical system according to any one of claims 6, 9, 10, 11, 22, 23, 24, and 25;
a photosensitive member placed on the scanning surface;
a developing device which develops an electrostatic latent image, formed on said photosensitive member by a light beam scanned by said scanning optical system, as a toner image;
a transferring device which transfers the developed toner image onto a transfer material; and
a fixing deice which fixes the transferred toner image onto the transfer material.

27. An image forming apparatus comprising:
a scanning optical system according to any one of claims 6, 9, 10, 11, 22, 23, 24, and 25; and
a printer controller which converts code data input from an external device into an image signal, and inputs the image signal to said scanning optical system.

* * * * *

UNITED STATES PATENT AND TRADEMARK OFFICE
CERTIFICATE OF CORRECTION

PATENT NO. : 6,927,917 B2
DATED : August 9, 2005
INVENTOR(S) : Kazumi Kimura

Figure 14:
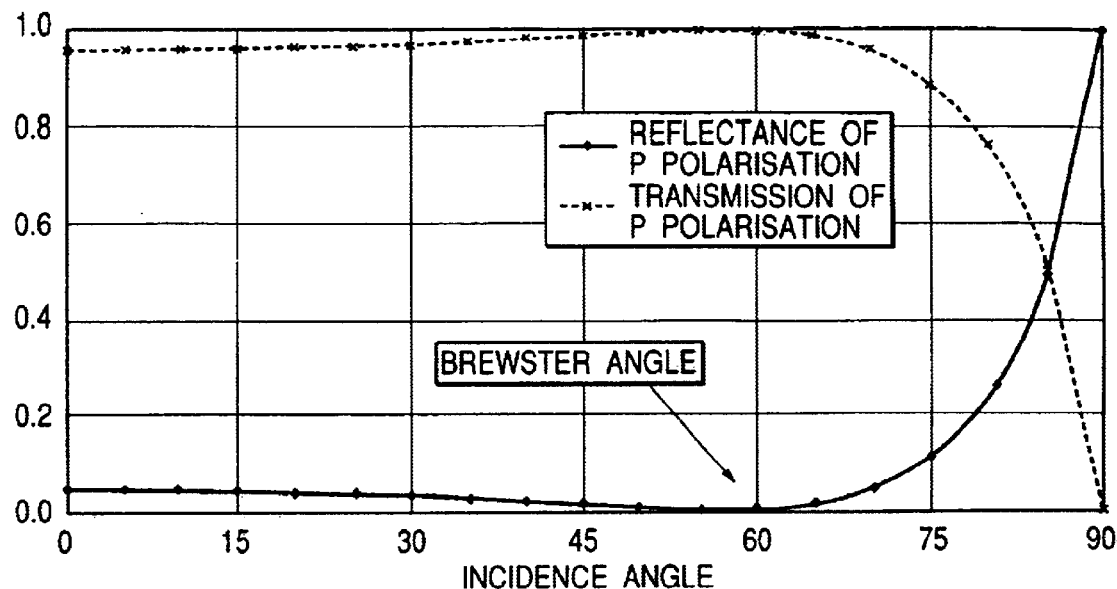
FIG. 14 is a graph for explaining the incidence angle dependency of reflection and transmission of P polarization.
Figure 15:
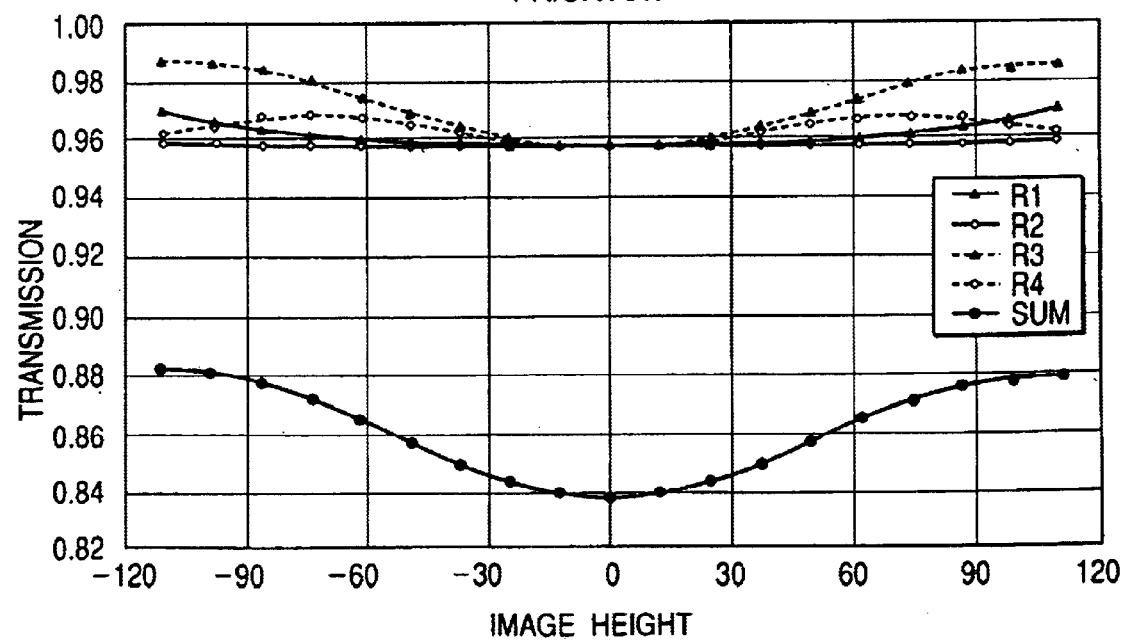
FIG. 15 is a graph showing the relationship between the image height and the transmission of the conventional scanning optical system.

It is certified that error appears in the above-identified patent and that said Letters Patent is hereby corrected as shown below:

Drawings,
Figure 4, "POLARISATION" should read -- POLARIZATION --;
Figure 11, "REFRECTANCE" should read -- REFLECTANCE --; and
Figure 14, both occurrences of "POLARISATION" should read -- POLARIZATION --.

Column 5,
Line 49, "deice" should read -- device --.

Column 7,
Line 52, "the-substantially" should read -- the substantially --.

Column 8,
Line 49, "1994)." should read -- 1994)). --.

Column 19,
Line 43, "a scanning" should be deleted.

Column 20,
Line 57, "deice" should read -- device --.

Signed and Sealed this

Seventh Day of February, 2006

JON W. DUDAS
*Director of the United States Patent and Trademark Office*